(12) United States Patent
Rasaratnam

(10) Patent No.: US 7,501,882 B2
(45) Date of Patent: Mar. 10, 2009

(54) CHARGE PUMPS

(75) Inventor: Dayananda K. Rasaratnam, West Lothian (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 6 days.

(21) Appl. No.: 11/846,841

(22) Filed: Aug. 29, 2007

(65) Prior Publication Data

US 2008/0054961 A1    Mar. 6, 2008

(30) Foreign Application Priority Data

Sep. 1, 2006  (EP)  ................... 06270083

(51) Int. Cl.
  *G05F 1/10* (2006.01)
  *G05F 3/02* (2006.01)

(52) U.S. Cl. ............... 327/536; 363/59; 363/60
(58) Field of Classification Search ............ 327/536
See application file for complete search history.

(56) References Cited

U.S. PATENT DOCUMENTS

| | | | |
|---|---|---|---|
| 5,936,459 A | 8/1999 | Hamamoto | 327/536 |
| 6,504,422 B1 | 1/2003 | Rader et al. | 327/536 |
| 2001/0009518 A1 | 7/2001 | Foss et al. | 363/60 |
| 2002/0110009 A1 | 8/2002 | Umeda | 363/60 |

*Primary Examiner*—Kenneth B Wells
*Assistant Examiner*—Daniel Rojas
(74) *Attorney, Agent, or Firm*—Lisa K. Jorgenson; Allen, Dyer, Doppelt, Milbrath & Gilchrist, P.A.

(57) ABSTRACT

The method is for controlling a charge pump of the type where two flying capacitors charge and discharge to a reservoir capacitor in sequence. Part of the switching is carried out in parallel, lengthening the charging pulse at the expense of the conventional comparatively long discharge pulse, thus providing operation at higher frequencies than previously possible.

22 Claims, 8 Drawing Sheets

CHARGE PUMPS

FIELD OF THE INVENTION

The present invention relates to the field of charge pumps, in particular to a method of operating a charge pump, a charge pump operable according to the method, and to a switch controller for controlling a charge pump according to the method.

BACKGROUND OF THE INVENTION

A charge pump is a circuit which uses capacitors and switches to store and transfer charge to convert a given DC voltage into a different DC voltage. Charge pumps can double, invert or generate arbitrary voltages, depending on the controller and circuit topology. They are capable of high efficiencies, sometimes as high as 90-95%.

An existing charge pump architecture is shown in FIG. 1. This is one example of a charge pump and is not intended to limit the field to which this invention relates. The charge pump in FIG. 1 comprises a main charge pump 10 and, optionally, an auxiliary pump 12 which may be required in some cases to generate voltages which are high enough to drive the gates of the main pump's switching circuit or means, which in a preferred embodiment comprise MOSFETs. However, it is to be understood that any other appropriate transistor or other switching circuit could be used as required.

The switch means are operable to alternately store charge onto first and second flying capacitors Cf1 and Cf2 by their selective connection to a first voltage source 14, connect the flying capacitors to a pedestal voltage source 16 and alternately discharging the flying capacitors Cf1 and Cf2 to a reservoir capacitor Crsvr for use in driving a load 18. The load 18 can be of any of a variety of different types, such as a resistive load or a current source for example. It is to be appreciated that the first voltage source 14 and pedestal voltage source 16 can be provided by a single potential difference. Maintaining them as separate voltage sources also gives greater flexibility in controlling the amount of charge to be injected during the pumping action. The present invention applies equally to either case, that is, whether the first voltage source 14 and pedestal voltage source 16 are combined or separate. When separate, the two voltage sources may be of equal or different values, as required.

The switch means comprise a first pedestal switch means SPL1 which selectively connects the first flying capacitor Cf1 either to the pedestal voltage source 16 or to ground, having a high state where the first flying capacitor Cf1 is connected to the pedestal voltage source 16 and a low state where the first flying capacitor Cf1 is both connected to ground and isolated from the pedestal voltage source 16.

The switch means also comprise a first charge switch means SCH1, operable between a high state which connects the first flying capacitor Cf1 to the first voltage source 14, when the other terminal of capacitor Cf1 is connected to ground by switch means SPL1, to charge the first flying capacitor Cf1, and a low state where the first flying capacitor Cf1 is isolated from the first voltage source 14. A first discharge switch means SDCH1 is operable between a high state where the first flying capacitor Cf1 and the reservoir capacitor Crsvr are disconnected, and a low state wherein the first flying capacitor Cf1 and the reservoir capacitor Crsvr are connected, when the other terminal of capacitor Cf1 is connected to the pedestal voltage source 16, so that charge is transferred from the first flying capacitor Cf1 to the reservoir capacitor Crsvr.

In a similar fashion, there is provided a second pedestal switch means SPL2 which selectively connects the second flying capacitor Cf2 either to the pedestal voltage source 16 or to ground, having a high state where the second flying capacitor Cf2 is connected to the pedestal voltage source 16 and a low state where the second flying capacitor Cf2 is both connected to ground and isolated from the pedestal voltage source 16. Also provided is a second charge switch means SCH2, operable between a high state which connects the second flying capacitor Cf2 to the first voltage source 14, when the other terminal of capacitor Cf2 is connected to ground by switch means SPL2, to charge the second flying capacitor Cf2, and a low state where the second flying capacitor Cf2 is isolated from the first voltage source 14. A second discharge switch means SDCH2 is operable between a high state where the second flying capacitor Cf2 and the reservoir capacitor Crsvr are disconnected, and a low state wherein the second flying capacitor Cf2 and the reservoir capacitor Crsvr are connected, when the other terminal of capacitor Cf2 is connected to the pedestal voltage source 16, so that charge is transferred from the second flying capacitor Cf2 to the reservoir capacitor Crsvr.

The various switch means are controlled with control signals, shown with arrowheads in FIG. 1 and prefixed with the reference "B". FIG. 1 shows for the sake of illustration one particular arrangement of the switches, where the switches are held in a position that occurs during a second charging period, as discussed later. The following references to FIG. 1 are intended to serve as a discussion of the various positions to which the illustrated switches are to be moved to, rather than meaning that each and every of the various positions are illustrated in FIG. 1. It is considered unnecessary to illustrate every possible configuration of the switches, as these would be too numerous. Rather, the various configurations will be well understood with reference to the diagram in FIG. 1 in conjunction with the explanation of the associated timing diagrams, as discussed later.

The sequencing of these switches must be carefully controlled to make sure that charge is correctly transferred within the circuit. The timing strategy of the various switches is illustrated in FIG. 2. It will be appreciated that the method of switching is cyclical and that any appropriate state of the switch means can be chosen as a nominal initial state. For the purposes of illustration, FIG. 2 illustrates an "initial" state wherein the charge previously gathered on the second flying capacitor Cf2 is being discharged to the reservoir capacitor Crsvr.

In this exemplary initial state, the first charge switch means SCH1 is held in a low state while the first discharge switch means SDCH1 is held in a high state, so that both switches are open. Similarly, a first pedestal switch means SPL1 is held in a low state, connected to the right so that the first flying capacitor Cf1 is connected to ground and isolated from the pedestal voltage source 16. Meanwhile, the second discharge switch means SDCH2 is held in a low state where the switch is closed, thus connecting the second flying capacitor Cf2 to the reservoir capacitor Crsvr; while the second pedestal switch means SPL2 is held in a high state, connected to the left hand side as shown in FIG. 1, such that the voltage provided by the first voltage source 14 is effectively raised by an amount equal to the voltage provided by the pedestal voltage source 16. Finally, the second charge switch SCH2 us held in a low state, open as shown in FIG. 1, such that the first voltage source 14 is isolated from the second flying capacitor Cf2. This situation is illustrated as time t=0, at the left side of the timing signals shown in FIG. 2, at which point the charge stored on the second flying capacitor Cf2 is being discharged to the reservoir capacitor Crsvr.

Starting from this state, the first charge switch means CH1 is raised to a high level so that, while the second flying capacitor Cf2 is still being discharged, the first voltage source 14 is connected to the first flying capacitor Cf1 and charge is gathered there. The time throughout the course of which the charging switch means is held in a high state is termed as a charging time or a charging period, and the control signal that achieves this is termed as a charge pulse, the width of which is understood to correlate to the time throughout which the signal holds the charge switch means in a high state. This terminology also applies to the second charge switch means SCH2, as described later.

After the first charge switch means SCH1 is switched back to a low state, the first pedestal switch PL1 is switched high, connecting the pedestal voltage source 16 to the first flying capacitor Cf1. Starting from this point in time, the first and second flying capacitors are connected, meaning that a small amount of charge may be transferred between them. After the first pedestal switch means 16 is switched high the first discharge switch means DCH1N is switched low (closed as shown in FIG. 1) so that the charge collected on the first flying capacitor Cf1 is discharged to the reservoir capacitor CRSVR, where once more the voltage provided by the first voltage source 14 is effectively raised by an amount equal to the voltage provided by the pedestal voltage source 16. The time throughout the course of which the discharge switch means is held in a low state is termed as a discharging time or a discharge period, and the control signal that achieves this is termed as a discharge pulse, the width of which is understood to correlate to the time throughout which the signal holds the discharge switch means in a low state. This terminology also applies to the second discharge switch means SDCH2 as described later.

After the first discharge switch means SDCH1 is switched low, the second discharge switch means SDCH2 is switched high (opening the switch as shown in FIG. 1) so that the reservoir capacitor Crsvr is isolated from the second flying capacitor Cf2, thus ending the discharge period for the second flying capacitor Cf2. After, and only after, the second discharge switch means SDCH2 has been put to high, the second pedestal switch means SPL2 is switched low (to the right as shown in FIG. 1) in order to isolate the second flying capacitor Cf2 from the pedestal voltage source 16 and from the first flying capacitor Cf1. Thus, once the switching has been completed, the second charge switch means SCH2 is put to high (closing the switch as shown in FIG. 1) such that the first voltage source 14 is connected to the second flying capacitor Cf2 to start the charge period for the second flying capacitor Cf2.

Once this charge period ends, the second pedestal switch means SPL2, second discharge switch means SDCH2, first discharge switch means SDCH1, first pedestal switch means SPL1 and first charge switch means CH1 operate sequentially in a similar fashion as described above to complete the cycle so that it is ready to start from the initial state once more.

The whole switching process is governed by the clock pulse CPCLK for the circuit, the falling edge of which corresponds to the falling edge of the first charge pulse and the rising edge of which corresponds to the falling edge of the second charge pulse. It is important that the switching is carried out in a strictly sequential fashion. The dependency of one switching operation on others is shown by the arrow heads in FIG. 2, where the switching at the head of the arrow must be performed after the switching at the foot of the arrow. These can in theory be carried out simultaneously, if gate delays are perfectly matched. This is however not possible in practice and it is therefore necessary to have a short delay between the pulse edge.

It will be seen from this timing sequence that the charge pulses (where CH1 and CH2 are high) are relatively narrow compared to the discharge pulses (where DCH1N and DCH2N are low). It can also be seen that there are overlap times, when a small amount of charge may be transferred between the flying capacitors, that is, there is a short period during which both the first pedestal switch SPL1 and the second pedestal switch SPL2 are high so that both are switched to the left and the two flying capacitors CF1 and CF2 are connected. The time period during which this connection occurs is illustrated by the dotted ovals 21 in FIG. 2. The efficiency with which charge is transferred to the load will be reduced if charge is allowed at any stage to flow between the first and second flying capacitors Cf1 and Cf2. This situation can not be eliminated with this switching scheme.

Charge pumps can be used in a wide variety of devices, and the scope of the invention is not limited to any particular device. However, for any given device, there is a requirement that a charge pump has to operate at a given frequency—this is represented by the clock pulse signal CPCLK in FIG. 2. The frequency at which a charge pump operates depends on how fast the flying capacitors can be charged and discharged. The rates of charge and discharge are illustrated schematically by the sloped shaded regions in FIG. 2. The rate of charge or discharge depends on the characteristics of the circuit (values of the various resistors and capacitors etc), the size of the reservoir capacitor, and the size of the load.

Circuit designers have been attempting to optimize circuit design to raise the frequency at which a charge pump can operate because of the advantages of physical size and the possibilities of integration that this provides.

SUMMARY OF THE INVENTION

According to a first aspect of the present invention there is provided a method of operating a charge pump, the charge pump comprising a first flying capacitor and a second flying capacitor each of which is selectively connectable between a voltage source and a reservoir capacitor via respective first and second charge switches or switch means for selectively connecting the capacitors to the voltage source. Discharge switches or switch means selectively connect the capacitors with the reservoir capacitor, and a pedestal switch or switch means is for selectively connecting the capacitors to the voltage source.

The method includes operating the switches or switch means with control signals that define: a first charge pulse throughout the course of which the first flying capacitor is connected to the voltage source; a second charge pulse throughout the course of which the second flying capacitor is connected to the voltage source; a first discharge pulse throughout the course of which the first flying capacitor is connected to the reservoir capacitor; a second discharge pulse throughout the course of which the second flying capacitor is connected to the reservoir capacitor; a first pedestal pulse throughout the course of which the first flying capacitor is connected to the voltage source; and a second pedestal pulse throughout the course of which the second flying capacitor is connected to the voltage source. The second discharge pulse is ended at a time between the end of the first charge pulse and the start of the first discharge pulse, and the first discharge pulse is ended at a time between the end of the second charge pulse and the start of the second discharge pulse.

The second pedestal pulse may be ended at a time between the end of the first charge pulse and the start of the first discharge pulse, and the first pedestal switch pulse may be ended at a time between the end of the second charge pulse and the start of the second discharge pulse. The second charge pulse may be started at a time between the end of the first charge pulse and the start of the first discharge pulse and the first charge pulse may be started at a time between the end of the second charge pulse and the start of the second discharge pulse.

The end of the second discharge pulse may be triggered by the end of the first charge pulse, and the end of the first discharge pulse may be triggered by the end of the second charge pulse. The start and end of the first pedestal pulse may be concomitant with the end and start of the second discharge pulse respectively, and the start and end of the second pedestal pulse may be concomitant with the end and start of the first discharge pulse respectively.

Alternatively, the end of the second discharge pulse may be triggered by a switching of a clock signal to one of either high or low, and the end of the first discharge pulse may be triggered by the switching of a clock signal to the other of either high or low.

The voltage source may comprise a first voltage source for connection to the first and second flying capacitors, and a second voltage source for connection to the first and second flying capacitors. The first voltage may be of the same magnitude as the second voltage.

According to a second aspect of the present invention, there is provided a charge pump comprising a first flying capacitor and a second flying capacitor each of which is selectively connectable between a voltage source and a reservoir capacitor via respective first and second charge switches or switch means for selectively connecting the capacitors to the voltage source, discharge switches or switch means for selectively connecting the capacitors with the reservoir capacitor, and pedestal switches or switch means for selectively connecting the capacitors to the voltage source.

A switch controller or control means is adapted to operate the switches or switch means with control signals that define: a first charge pulse throughout the course of which the first flying capacitor is connected to the voltage source; a second charge pulse throughout the course of which the second flying capacitor is connected to the voltage source; a first discharge pulse throughout the course of which the first flying capacitor is connected to the reservoir capacitor; a second discharge pulse throughout the course of which the second flying capacitor is connected to the reservoir capacitor; a first pedestal pulse throughout the course of which the first flying capacitor is connected to the voltage source; and a second pedestal pulse throughout the course of which the second flying capacitor is connected to the voltage source. The switch controller or control means is adapted to end the second discharge pulse at a time between the end of the first charge pulse and the start of the first discharge pulse, and to end the first discharge pulse at a time between the end of the second charge pulse and the start of the second discharge pulse.

The switch control means may be adapted to end the second pedestal pulse at a time between the end of the first charge pulse and the start of the first discharge pulse, and to end the first pedestal switch pulse at a time between the end of the second charge pulse and the start of the second discharge pulse. The switch control means may be adapted to start the second charge pulse at a time between the end of the first charge pulse and the start of the first discharge pulse and to start the first charge pulse at a time between the end of the second charge pulse and the start of the second discharge pulse.

The switch control means may be adapted to trigger the end of the second discharge pulse at or after the end of the first charge pulse, and to trigger the end of the first discharge pulse at or after the end of the second charge pulse. The switch control means may be adapted for operation such that the start and end of the first pedestal pulse are concomitant with the end and start of the second discharge pulse respectively, and the start and end of the second pedestal pulse are concomitant with the end and start of the first discharge pulse respectively.

Alternatively, the switch control means may be adapted for operation such that the end of the second discharge pulse is triggered by a switching of a clock signal to one of either high or low, and the end of the first discharge pulse is triggered by the switching of a clock signal to the other of either high or low. The voltage source may comprise a first voltage source for connection to the first and second flying capacitors, and a second voltage source for connection to the first and second flying capacitors. The voltage provided by the first voltage source may be of the same magnitude as the voltage provided by the second voltage source.

According to a third aspect, there is provided a switch controller or control means for operation with a charge pump according to the second aspect.

According to further aspects, there is provided a device that comprises the charge pump of the second aspect, where the device can be an image sensor, or a further device incorporating the image sensor such as a mobile telephone, digital still camera, webcam or optical mouse.

BRIEF DESCRIPTION OF THE DRAWINGS

The present invention will now be described, by way of example only, with reference to the accompanying drawings, in which.

DETAILED DESCRIPTION OF THE PREFERRED EMBODIMENTS

An example application of a charge pump is for use in an image sensor. Within the context of an image sensor, there are many different possible functions for a charge pump but one important use is for supplying a sufficiently high voltage to a linear regulator for a pixel array. In this case, the supplied voltage falls during an interline period as a result of the large value of the load current during this period. It is therefore essential for correct operation of the image sensor that the charge pump can restore this voltage to its original value during the intervening line time before the next interline period. This means that both charge and discharge pulse durations must be sufficiently long to ensure that there is enough time for charge to be integrated onto the flying capacitors and discharged into the output reservoir capacitor. This requirement, for the known method of operation and the consequent charge pulse duration, places a limitation on the operation frequency of the charge pump circuit.

Given a particular circuit topology, the charge transfer may be improved by adjusting the time constants of the circuit, that is, by amending resistor and capacitor values so that the rate of charge transfer is increased in the available time. However, amending a circuit in this way will not always be possible, and there are limits as to how much the time constant can be varied within the constraints of specified design requirements.

Figure 1:
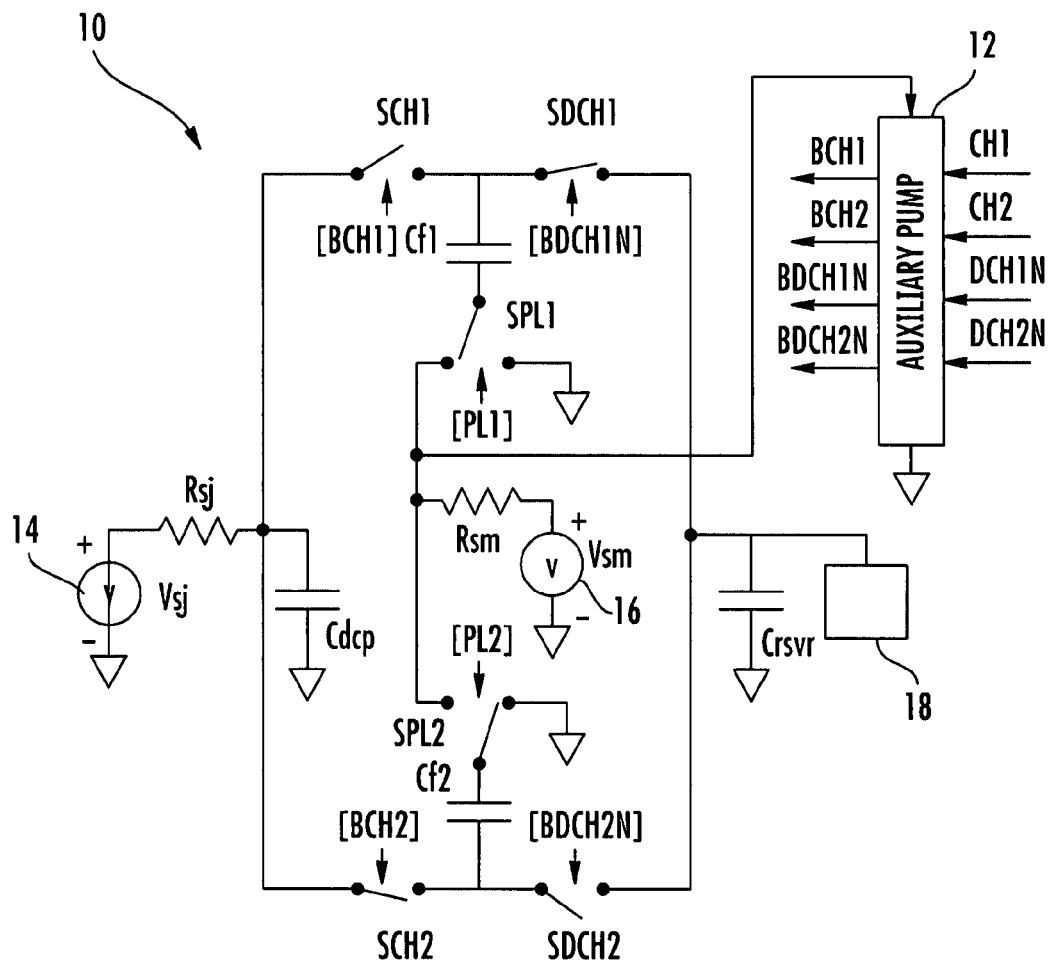
FIG. 1 is a schematic diagram illustrating a known charge pump circuit.
Figure 2:
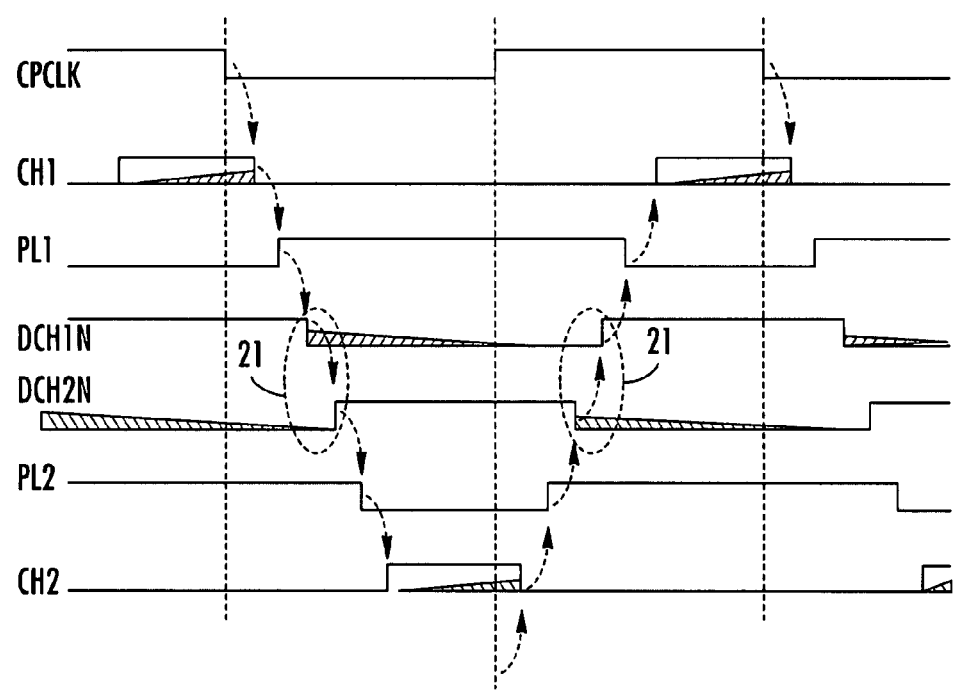
FIG. 2 is a timing diagram illustrating a known method of operation of the charge pump circuit of FIG. 1.

The pump circuit of FIG. 1 works well with the timing diagram of FIG. 2 at a clock frequency of around 12 MHz. However mobile devices, with the drive towards smaller size and therefore increased integration, would benefit from operating at switching frequencies of up to 50 MHz or even higher. In addition, robust operation of these types of circuits is required over a wide temperature range of for example −40 to +125 degrees C. Operation at these higher frequencies would allow the use of an "on-chip" oscillator and has the added advantage of requiring smaller flying capacitors as the amount of charge to be transferred per charging cycle is smaller.

Figure 3:
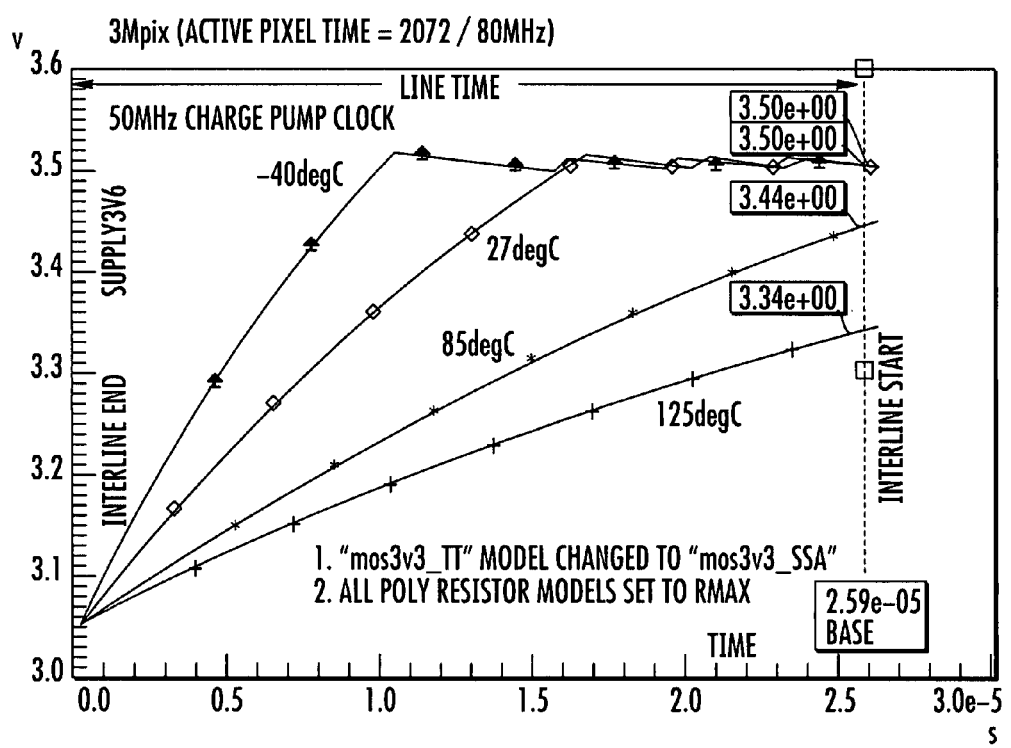
FIG. 3 is a graph illustrating the performance characteristics of the charge pump circuit of FIG. 1.

FIG. 3 shows an example of the limitations of the prior art design and switching strategy shown in FIG. 2. The example shown is a simulation where the load 18 to be driven comprises a 3 megapixel array driven with a 50 MHz charge pump clock. Four different curves illustrate the performance at temperatures of minus 40 degrees C., 27 degrees C., 85 degrees C. and 125 degrees C. At t=0, the interline period has just finished and the voltage has dropped to just over 3.05 volts. It is crucial that the voltage does not drop beyond a predetermined level at the end of the interline period because if it drops too far the regulated supply voltage Vrt which is derived from it and services the image sensors pixel array becomes affected.

It is also essential in this application that the charge pump output supply voltage recovers to its original level within a line period and prior to the next interline period. It can be seen, at temperatures of −40 degrees C. and +27 degrees C., that the output supply voltage is able to recover to its original level of 3.5 volts, after approximately $1e10^{-5}s$ and $1.7e10^{-5}s$ respectively. However, for the cases of 85 degrees C. and 125 degrees C., the output supply voltage is not restored to its original level during the line time and thus the pump circuit does not meet the required performance characteristics for operation at 50 MHz.

Figure 4:
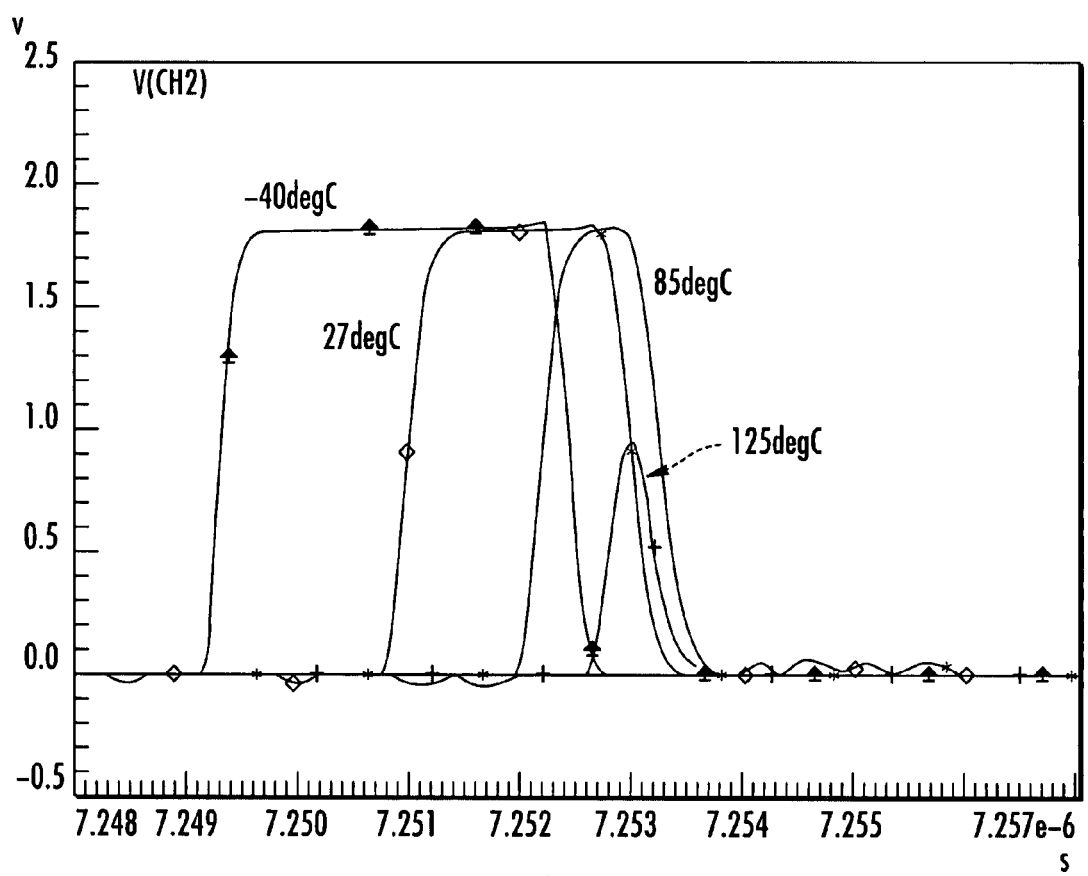
FIG. 4 is a graph illustrating further performance characteristics of the charge pump circuit of FIG. 1.

This problem and its exacerbation with temperature is also illustrated in FIG. 4, where the width of an already narrowed charge pulse is seen to reduce with increasing temperature. The charge pulses will eventually collapse due to the increasing delay as temperature is increased.

Figure 5:
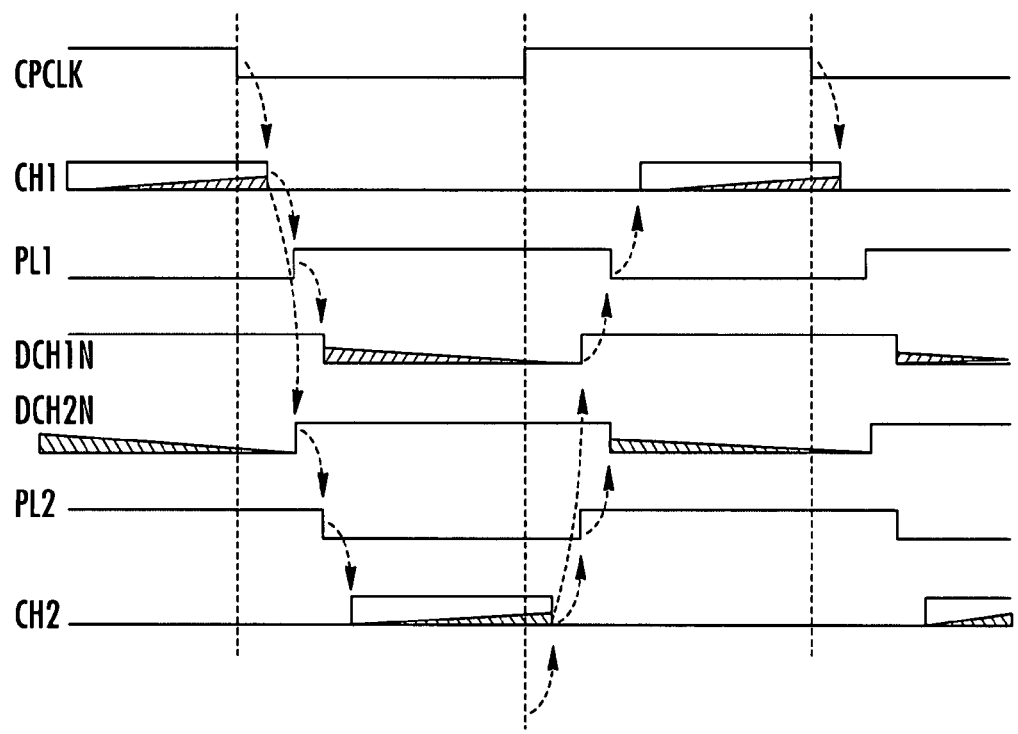
FIG. 5 is a timing diagram illustrating an enhanced timing strategy for the circuit of FIG. 1 in accordance with a first embodiment.

FIG. 5 illustrates an enhanced timing strategy according to a first embodiment. The arbitrarily selected initial state, at the extreme left of the diagram, is the same as that described in FIG. 2 wherein the charge from the second flying capacitor Cf2 is being discharged to the reservoir capacitor Crsvr of FIG. 1.

The first charge switch means SCH1 is switched high (that is, to the closed position in the circuit diagram of FIG. 1) to start the first charge period. After the first charge period is ended by the falling edge of the clock (which causes the first charge switch to be switched low) the first pedestal switch means SPL1 is switched high, i.e. connected to the left as shown in FIG. 1. However, the end of the first charge pulse also triggers the switching of the second discharge switch means SDCH2 to a high state, opening the switch as shown in FIG. 1. The switching of the first pedestal switch means SPL1 and the second discharge switch means SDCH2 are therefore constrained to follow the end of the charge period and will occur more or less at the same time if interconnect and gate delays are reasonably matched. Opening the second discharge switch means SDCH2 at this time means that the second discharge period is cut by a certain amount as compared with the discharge period obtained with the switching operation of FIG. 2.

Following from the rising edge of the first pedestal pulse, the first discharge switch means SDCH1 is put low, commencing discharge of the charge gathered on the first flying capacitor Cf1 to the reservoir capacitor Crsvr. Since the falling edge of the first discharge pulse is constrained to follow the rising edge of the first pedestal pulse, and therefore the rising edge of the second discharge pulse when interconnect and gate delays are reasonably matched, the first and second flying capacitors Cf1 and Cf2 will, unlike in the prior art strategy, remain isolated from each other. Following the rising edge of the second discharge pulse, first the second pedestal switch means SPL2 is put low and then the second charge switch means SCH2 is put high, to connect the second flying capacitor Cf2 to the first voltage source 14 and replenish its charge. The end of the second discharge period has therefore been advanced, with respect to the switching operation of FIG. 2, as has the commencement of the second charge period.

The rising edge of the charge pump clock triggers the next sequence of transitions, starting with the falling edge of the second charge pulse which then triggers both the second pedestal switch means PL2 and the first discharge switch means DCH1 to be switched high, cutting short the first discharge period with respect to the discharge period obtained with the switching operation of FIG. 2. Since the falling edge of the second discharge pulse is constrained to follow the rising edge of the second pedestal pulse, and therefore the rising edge of the first discharge pulse when interconnect and gate delays are reasonably matched, the first and second flying capacitors Cf1 and Cf2 will, unlike in the prior art strategy, remain isolated from each other.

Following the rising edge of the first discharge pulse, initially the first pedestal switch means SPL1 is put low and then the first charge switch means SCH1 is put high, to connect the first flying capacitor Cf1 to the first voltage source 14 and replenish its charge. The end of the first discharge period has as a consequence been advanced, with respect to the switching operation of FIG. 2, as has the commencement of the first charge period.

In the prior switching method of FIG. 2, each switch transition causes the occurrence, after a short delay, of just a single subsequent switch transition, to realize a strictly sequential switching strategy. The new timing strategy of FIG. 5 however introduces a degree of parallel operation in that selected pairs of switch transitions are allowed to occur in parallel.

It may be essential to ensure that the two charge periods do not overlap and that the two discharge periods do not overlap, for any significant amount of time. However as can be seen from FIG. 5, the commencement of a charge pulse in one half of the circuit is constrained to follow the end of the immediately preceding charge pulse in the other half of the circuit and provided that interconnect and gate delays are reasonably matched this is also true for the discharge pulses. In a similar fashion, the bottom half of the circuit is switched to end the second discharge period during the first discharge period, preferably also switching the second pedestal switch means and starting the second charging period during the first discharge period, and again, the first and second charge pulses do not overlap.

With this new timing, the charge pulses are lengthened when compared with the charge pulses using the timing strategy of FIG. 2, while the discharge pulses are shortened when compared with the discharge pulses shown in FIG. 2. In the timing strategy of FIG. 2, the second discharge switch means SDCH2 had a dependency (illustrated with the arrows) on the first discharge switch means SDCH1, but now according to the operating method of FIG. 5, the second discharge switch means SDCH2 is actually switched before the first discharge switch means SDCH1.

Note that with this improved switching strategy the requirement for the discharge pulses DCH1N and DCH2N to always fall within the bounds of the pedestal high pulses PL1 and PL2 continues to be met. Furthermore, the charge pulses CH1 and CH2 are not overlapping. Therefore correct operation of the charge pump is ensured. Avoidance of transient overlaps between the discharge pulses DCH1N and DCH2N may be guaranteed with appropriate gate and interconnected delay implementation.

Figure 6:
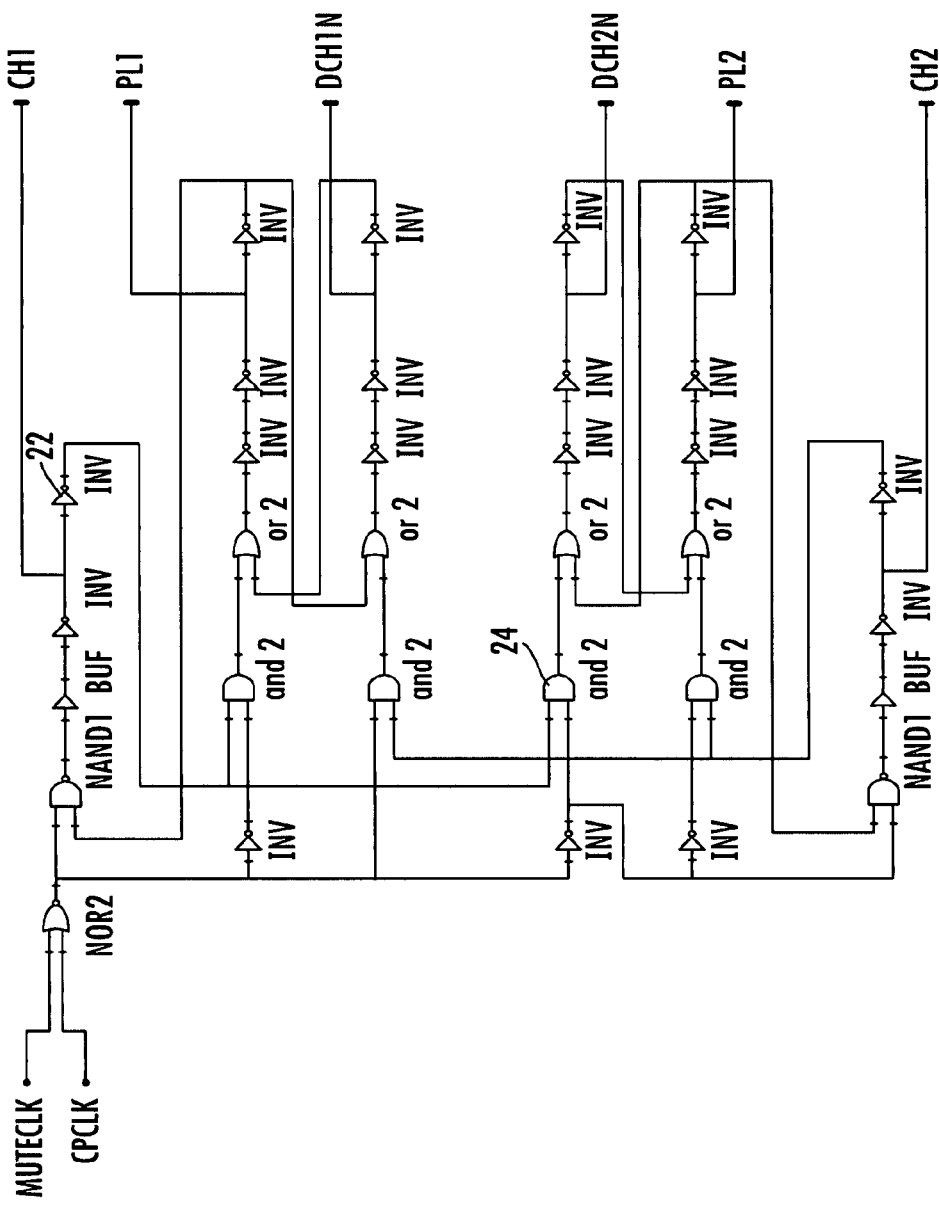
FIG. 6 is a schematic diagram illustrating a gate level implementation for the timing strategy of FIG. 5.

FIG. 6 shows a gate level implementation of the invention. The difference between the timing strategy of FIGS. 5 and 2 is symbolized in the connection between the inverter 22 and the AND gate 24, which would be absent if the timing strategy of FIG. 2 was to be implemented.

Figure 7:
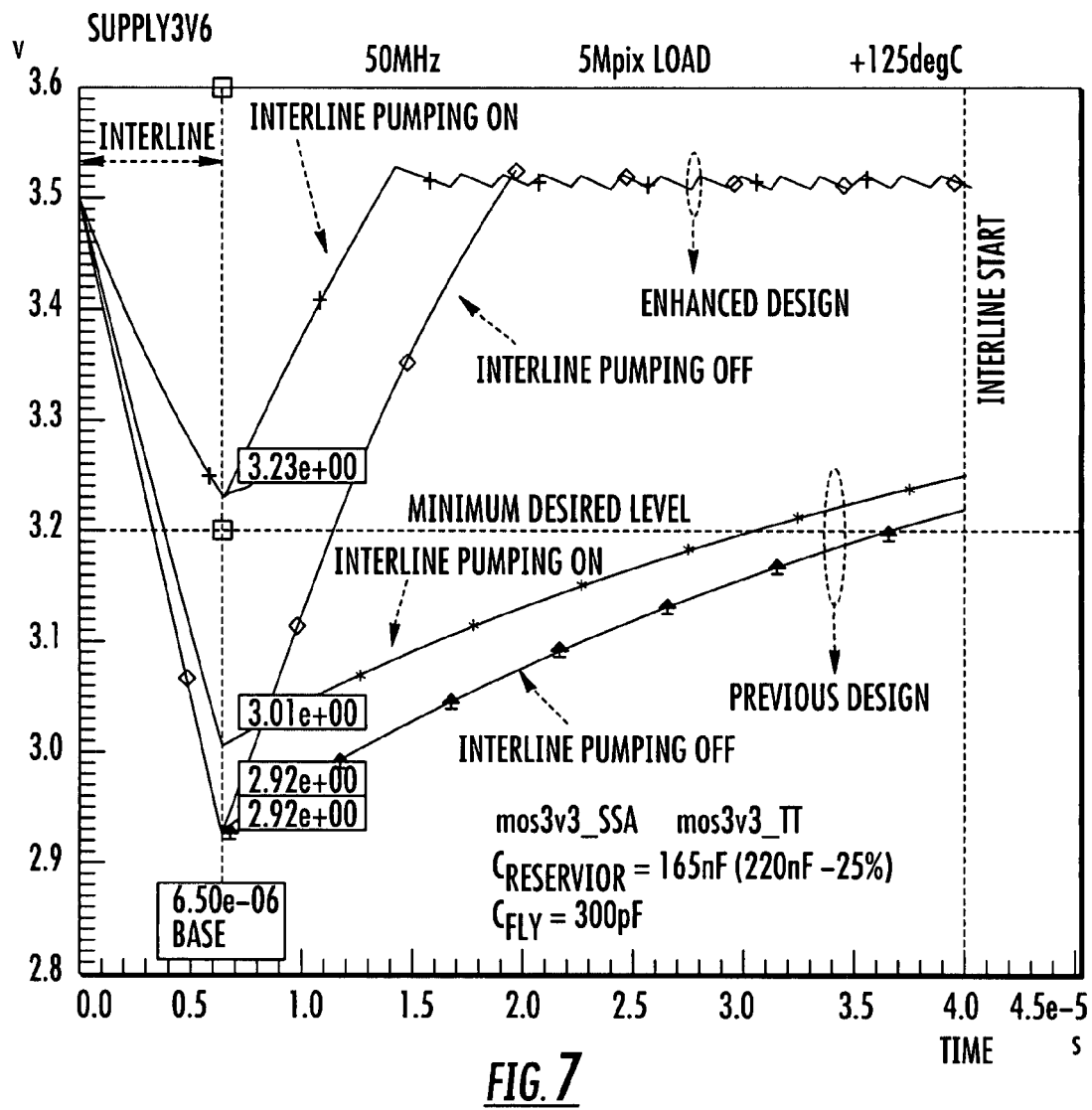
FIG. 7 is a graph illustrating a performance comparison between the timing strategies of FIGS. 2 and 5.

FIG. 7 illustrates the simulated performance of the enhanced timing strategy of FIG. 5 as compared with the standard timing strategy of FIG. 2 (previous design). In this particular example the load model is of a five megapixel image sensing array and the charge pump clock is set at 50 mHz while the interline time is 6.5 μs. The choice of transistor parametric deviation and value of reservoir capacitors and flying capacitors are chosen to represent a "worst case" scenario. The reservoir capacitor is assumed to be 165nF while the charge pump flying capacitors are both assumed to be 300pF.

The results are plotted for operation at a worst case temperature, for a particular application, of 125 degrees C. The required voltage to be supplied to the pixel array is just over 3.5 volts and the minimum acceptable level to which this voltage may drop is chosen to be 3.2 volts. The minimum acceptable level will of course vary according to different pixel array regulator requirements. The enhanced design and the previous design performances are shown with interline charge pumping both on and off. As a charge pump can produce a significant amount of switching noise it is normal to have it switched off during the interline period when relatively small signals are being sampled. However when the pixel array load current is large, the charge pump can be left on to prevent the reservoir capacitor voltage from falling below a minimum desired level as illustrated by the plots. The minimum desired level will vary according to the design of the pixel array and the voltage regulator that it uses. The important requirement for the charge pump is that it is able to charge up the output reservoir capacitor voltage from the reduced level at the end of an interline period to its original level, before the commencement of the next interline period. It can be seen from these simulation results that the previous design fails to recover the output voltage, before the beginning of the next interline period, irrespective of whether the interline charge pumping is on or off.

The enhanced design on the other hand is able to restore the output voltage to its original value with plenty of margin in time, even when the voltage has dropped considerably, to 2.92V in the illustrated case when pumping off during the interline period.

FIG. 7 is chosen to be a "worst case" scenario and it will be appreciated that choosing different values of reservoir capacitor or flying capacitor would render acceptance performance at 125 degrees even with the interline pumping switched off, and in particular the performance at lower temperatures or for lesser loads would also be within acceptance limits. It can be seen also from FIG. 7 that there are secondary improvements concerned with reducing the output impedance of the voltage sources which supply the charge pump to increase the rate of charge transfer to and from the flying capacitors.

Figure 8:
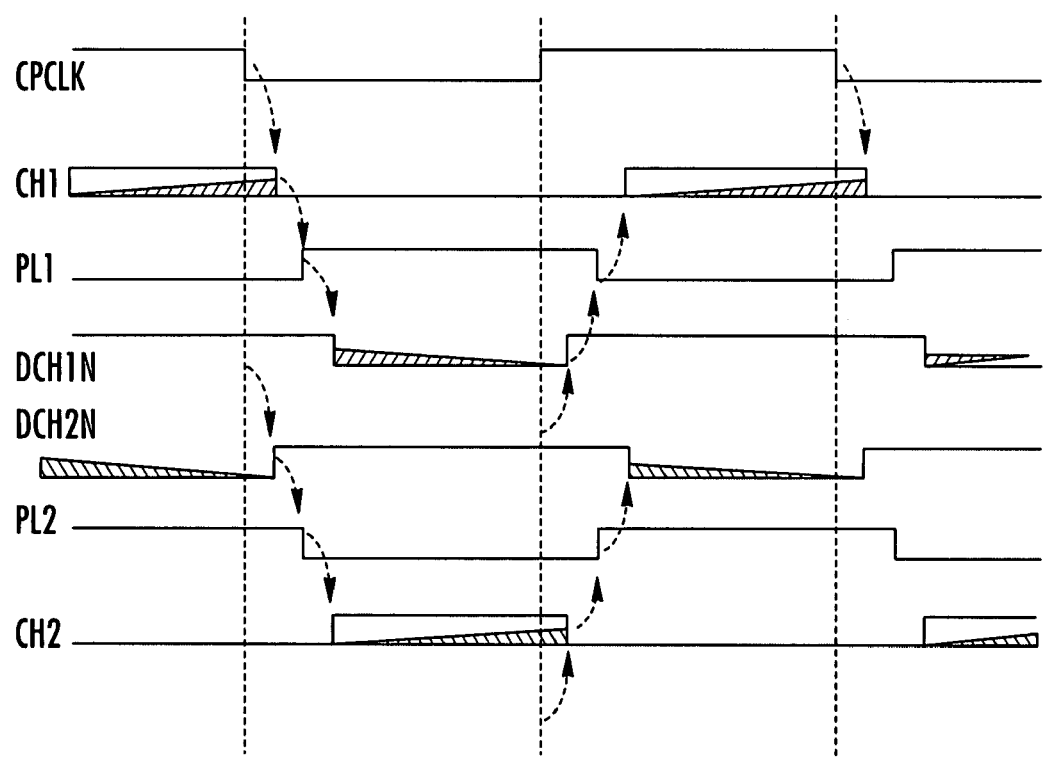
FIG. 8 is a timing diagram illustrating an enhanced timing strategy for the circuit of FIG. 1 in accordance with a second embodiment.

A second embodiment of a switching strategy is illustrated in FIG. 8. As with the timing shown in FIG. 5, the second discharge switch means SDCH2 is actually switched before the first discharge switch means SDCH1. However, in this case as shown in FIG. 8, the rising edge of the second discharge switch pulse DCH2N has been advanced with reference to the previous example of FIG. 5 by making it sequentially dependent on the falling edge of the clock signal, rather than the falling edge of the first charge pulse. Likewise, the rising edge of the first discharge switch pulse DCH1N has been further advanced with respect to the timing strategy shown in FIG. 5 by making it sequentially dependent on the clock signals rising edge, rather than falling edge of the second charging switch pulse. This makes better use of the whole width of the clock cycle giving an additional increase in the charge pulse CH1 and CH2 at the expense of a further decrease in the discharge pulse widths DCH1 and DCH2. This provides approximately equal width charge and discharge pulses provided that gate delays are appropriately matched.

Within the strategy of FIG. 8 it is important to ensure that DCH1N and DCH2N will not be low at the same time and likewise that CH1 and CH2 are never high at the same time. However, the required switching sequence lends itself to configuring the delays in the control signal paths so that this is achieved.

Note that for all the above strategies an increase in the clock frequency for given sequential delay magnitudes or vice versa will result in the narrowing of the charge and discharge pulse widths. However, this narrowing will not result in a noticeable degradation in charge pump efficiency while the charge or discharge pulse widths are several times greater than the associated time constants.

As mentioned above, with existing charge pumps there is a problem of how to efficiently charge and discharge the capacitors within the time constraints given by desired system performance. Traditionally, the skilled artisan would assume sequential switching (as set out in FIG. 2) and, given the objective of increasing charge pump efficiency he/she would try to reduce the time constant of the circuit by making appropriate adjustments to the values of the resistors and capacitors. However, the present inventor has realized that the sequential switching sequence itself can be altered to solve these problems. Of course, the circuit parameters can be modified to optimize the time constant in addition to the new switching methodology.

The image sensor application mentioned above may be incorporated within a number of different devices, including without limitation a digital still camera, a video camera, a mobile telephone, an optical mouse, a webcam, for example. The skilled artisan will possess sufficient knowledge, without further teaching required herein, for implementing the charge pump switching control mechanism in each of these devices. The same applies to the skilled artisan in other fields which use charge pumps. That is, it is to be understood that the charge pump and its associated method of operation as described herein are intended to be applicable to any device in which a charge pump is to be incorporated. It can be scaled without limitation for use with charge pumps that supply voltages of any magnitude and in any type of device.

Various improvements and modifications can be made to the above without departing from the scope of the invention. In particular, the invention is described as being advantageous for enabling operation at frequencies of 50 MHz or above. However, it will be appreciated of course that the invention will provide operational advantages at any frequency of operation, higher or lower.

That which is claimed:

1. A method of operating a charge pump, the charge pump comprising a first flying capacitor and a second flying capacitor each of which is selectively connectable between a voltage source and a reservoir capacitor via respective first and second charge switches for selectively connecting the capacitors to the voltage source, discharge switches for selectively connecting the flying capacitors with the reservoir capacitor, and pedestal switches for selectively connecting the capacitors to the voltage source, the method comprising:

operating the switches with control signals that define
a first charge pulse throughout the course of which the first flying capacitor is connected to the voltage source,
a second charge pulse throughout the course of which the second flying capacitor is connected to the voltage source,
a first discharge pulse throughout the course of which the first flying capacitor is connected to the reservoir capacitor,
a second discharge pulse throughout the course of which the second flying capacitor is connected to the reservoir capacitor,
a first pedestal pulse throughout the course of which the first flying capacitor is connected to the voltage source, and
a second pedestal pulse throughout the course of which the second flying capacitor is connected to the voltage source; and
ending the second discharge pulse at a time between the end of the first charge pulse and the start of the first discharge pulse; and
ending the first discharge pulse at a time between the end of the second charge pulse and the start of the second discharge pulse.

2. The method of claim 1, further comprising:
ending the second pedestal pulse at a time between the end of the first charge pulse and the start of the first discharge pulse; and
ending the first pedestal switch pulse at a time between the end of the second charge pulse and the start of the second discharge pulse.

3. The method of claim 2, wherein the second charge pulse is started at a time between the end of the first charge pulse and the start of the first discharge pulse, and the first charge pulse is started at a time between the end of the second charge pulse and the start of the second discharge pulse.

4. The method of claim 1, wherein the end of the second discharge pulse is triggered by the end of the first charge pulse, and the end of the first discharge pulse is triggered by the end of the second charge pulse.

5. The method of claim 1, wherein the start and end of the first pedestal pulse are associated with the end and start of the second discharge pulse respectively, and the start and end of the second pedestal pulse are associated with the end and start of the first discharge pulse respectively.

6. The method of claim 5, wherein the end of the second discharge pulse is triggered by a switching of a clock signal to a first state, and the end of the first discharge pulse is triggered by the switching of a clock signal to a second state.

7. The method of claim 1, wherein the voltage source comprises first and second voltages for connection to the first and second flying capacitors.

8. The method of claim 7, wherein the first voltage is of the same magnitude as the second voltage.

9. A charge pump comprising:
a voltage source;
a reservoir capacitor;
a first flying capacitor and a second flying capacitor each of which is selectively connectable between the voltage source and the reservoir capacitor;
respective charge switches for selectively connecting the first and second flying capacitors to the voltage source;
respective discharge switches for selectively connecting the first and second flying capacitors with the reservoir capacitor;
respective pedestal switches for selectively connecting the first and second flying capacitors to the voltage source; and
a switch controller to operate the charge, discharge and pedestal switches with control signals that define
a first charge pulse throughout the course of which the first flying capacitor is connected to the voltage source,
a second charge pulse throughout the course of which the second flying capacitor is connected to the voltage source,
a first discharge pulse throughout the course of which the first flying capacitor is connected to the reservoir capacitor,
a second discharge pulse throughout the course of which the second flying capacitor is connected to the reservoir capacitor,
a first pedestal pulse throughout the course of which the first flying capacitor is connected to the voltage source, and
a second pedestal pulse throughout the course of which the second flying capacitor is connected to the voltage source;
the switch controller operating to end the second discharge pulse at a time between the end of the first charge pulse and the start of the first discharge pulse, and to end the first discharge pulse at a time between the end of the second charge pulse and the start of the second discharge pulse.

10. The charge pump of claim 9, wherein the switch controller operates to end the second pedestal pulse at a time between the end of the first charge pulse and the start of the first discharge pulse, and to end the first pedestal switch pulse at a time between the end of the second charge pulse and the start of the second discharge pulse.

11. The charge pump of claim 10, wherein the switch controller operates to start the second charge pulse at a time between the end of the first charge pulse and the start of the first discharge pulse, and to start the first charge pulse at a time between the end of the second charge pulse and the start of the second discharge pulse.

12. The charge pump of claim 11, wherein the switch controller operates to trigger the end of the second discharge pulse at or after the end of the first charge pulse, and to trigger the end of the first discharge pulse at or after the end of the second charge pulse.

13. The charge pump of claim 12, wherein the switch controller operates such that the start and end of the first pedestal pulse are associated with the end and start of the second discharge pulse respectively, and the start and end of the second pedestal pulse are associated with the end and start of the first discharge pulse respectively.

14. The charge pump of claim 12, wherein the switch controller operates such that the end of the second discharge pulse is triggered by a switching of a clock signal to a first state, and the end of the first discharge pulse is triggered by the switching of a clock signal to a second state.

15. The charge pump of claim 14, wherein the voltage source comprises first and second voltage sources for connection to the first and second flying capacitors.

16. The charge pump of claim 15, wherein the voltage provided by the first voltage source is of the same magnitude as the voltage provided by the second voltage source.

17. An electronic device comprising:
a charge pump including
a voltage source,
a reservoir capacitor,
a first flying capacitor and a second flying capacitor each of which is selectively connectable between the voltage source and the reservoir capacitor,
respective charge switches for selectively connecting the first and second flying capacitors to the voltage source,
respective discharge switches for selectively connecting the first and second flying capacitors with the reservoir capacitor,
respective pedestal switches for selectively connecting the first and second flying capacitors to the voltage source, and
a switch controller to operate the charge, discharge and pedestal switches with control signals that define
a first charge pulse throughout the course of which the first flying capacitor is connected to the voltage source,
a second charge pulse throughout the course of which the second flying capacitor is connected to the voltage source,
a first discharge pulse throughout the course of which the first flying capacitor is connected to the reservoir capacitor,
a second discharge pulse throughout the course of which the second flying capacitor is connected to the reservoir capacitor,
a first pedestal pulse throughout the course of which the first flying capacitor is connected to the voltage source, and
a second pedestal pulse throughout the course of which the second flying capacitor is connected to the voltage source,
the switch controller operating to end the second discharge pulse at a time between the end of the first charge pulse and the start of the first discharge pulse, and to end the first discharge pulse at a time between the end of the second charge pulse and the start of the second discharge pulse.

18. The electronic device of claim 17 wherein the electronic device is an image sensor.

19. The electronic device of claim 17 wherein the electronic device is a mobile telephone having an image sensor including said charge pump.

20. The electronic device of claim 17 wherein the electronic device is a digital still camera having an image sensor including said charge pump.

21. The electronic device of claim 17 wherein the electronic device is a webcam having an image sensor including said charge pump.

22. The electronic device of claim 17 wherein the electronic device is an optical mouse having an image sensor including said charge pump.

* * * * *